United States Patent
Rizzardini et al.

(10) Patent No.: US 11,249,562 B2
(45) Date of Patent: Feb. 15, 2022

(54) POINTING ELECTRONIC DEVICE WITH FAST START-UP RECOVERY AND CORRESPONDING METHOD

(71) Applicant: STMicroelectronics S.r.l., Agrate Brianza (IT)

(72) Inventors: Federico Rizzardini, Settimo Milanese (IT); Stefano Paolo Rivolta, Desio (IT); Lorenzo Bracco, Chivasso (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/162,446

(22) Filed: Jan. 29, 2021

(65) Prior Publication Data
US 2021/0240285 A1    Aug. 5, 2021

(30) Foreign Application Priority Data
Jan. 31, 2020   (IT) .......................... 102020000001933

(51) Int. Cl.
*G09G 5/00* (2006.01)
*G06F 3/0346* (2013.01)
*G06F 3/0487* (2013.01)
*G06F 3/0354* (2013.01)

(52) U.S. Cl.
CPC .......... *G06F 3/0346* (2013.01); *G06F 3/0487* (2013.01); *G06F 3/03545* (2013.01)

(58) Field of Classification Search
None
See application file for complete search history.

(56) References Cited

U.S. PATENT DOCUMENTS

| 2006/0279549 | A1* | 12/2006 | Zhang | G06F 3/03545 345/173 |
|---|---|---|---|---|
| 2011/0199298 | A1 | 8/2011 | Bassompiere et al. | |
| 2013/0106740 | A1* | 5/2013 | Yilmaz | G06F 3/04883 345/173 |
| 2013/0151195 | A1 | 6/2013 | Marinoni | |
| 2021/0033402 | A1 | 2/2021 | Rosingana et al. | |

(Continued)

OTHER PUBLICATIONS

U.S. Appl. No. 17/191,320, filed Mar. 3, 2021.

*Primary Examiner* — Carl Adams
(74) *Attorney, Agent, or Firm* — Slater Matsil, LLP (57) ABSTRACT

In an embodiment pointing electronic device, a sensor fusion processing stage generates an orientation estimation quantity indicative of an orientation about a longitudinal axis based on a sensor fusion algorithm envisaging processing of acceleration and gyroscopic signals; and a pointing determination stage implements an orientation-compensation of the gyroscopic signal as a function of the orientation estimation and generates screen-frame displacement data corresponding to 3D-space movements of the pointing electronic device based on the orientation-compensated gyroscopic signal. A processing block provides a starting value of the roll estimation, used to decrease an initial roll estimation error, by storing past values of the acceleration signal, during a time interval preceding start-up; and, upon start-up, retrieving and processing the stored past values to generate processed acceleration data, used by the sensor fusion processing stage to initialize the sensor fusion algorithm and generate the starting value of the roll estimation quantity.

20 Claims, 4 Drawing Sheets

(56) References Cited

U.S. PATENT DOCUMENTS

2021/0034167 A1    2/2021   Rizzardini et al.
2021/0034170 A1    2/2021   Rivolta et al.
2021/0034171 A1    2/2021   Rivolta et al.

* cited by examiner

POINTING ELECTRONIC DEVICE WITH FAST START-UP RECOVERY AND CORRESPONDING METHOD

CROSS-REFERENCE TO RELATED APPLICATIONS

This application claims the benefit of Italian Application No. 102020000001933, filed on Jan. 31, 2020, which application is hereby incorporated herein by reference.

TECHNICAL FIELD

Embodiments relate to a pointing electronic device, in particular for so called "air-pointer" applications, having a fast start-up recovery, and to a corresponding method.

BACKGROUND

As is known, pointing electronic devices include traditional pointers (i.e., devices dedicated to pointing functions) and also smart pens or digital pens or styluses or smart pencils (or similar handheld devices having further and different functions in addition to a pointing function) that are to be coupled to an electronic host apparatus (e.g., a laptop, a tablet, a smart TV, a monitor or a smartphone).

SUMMARY

These pointing electronic devices usually implement an HID (Human Interface Device) pointer (or mouse) interface, or protocol, in order to send displacement information (in particular, information associated with a displacement between a current and a previous position) to the host apparatus, in terms of coordinates in a screen-frame of the same host apparatus.

A control unit of the host apparatus is thus able to move a displayed object (e.g., a cursor or the like) on the screen-frame based on the received displacement information.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF ILLUSTRATIVE EMBODIMENTS

Figure 1:
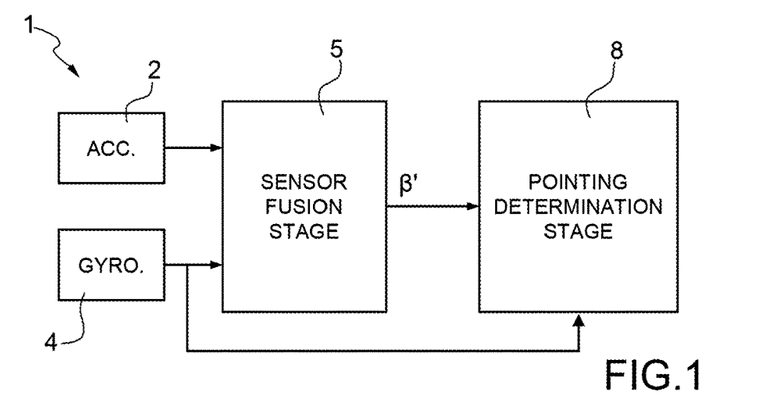
FIG. 1 shows a schematic block diagram of a known pointing electronic device.
Figure 2:
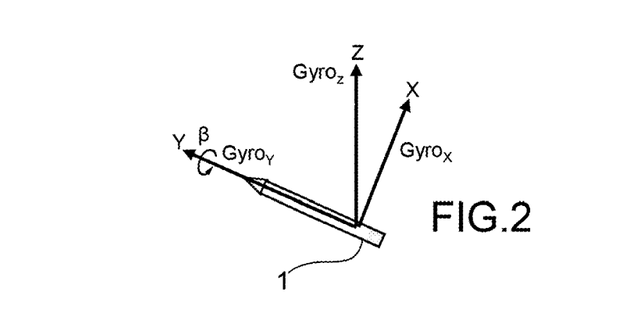
FIG. 2 is a schematic depiction of the pointing electronic device and corresponding gyroscopic signal components.

As schematically shown in FIGS. 1 and 2, a known pointing electronic device 1 includes:

an accelerometer sensor 2, in particular a MEMS (Micro Electro Mechanical System) triaxial accelerometer, providing an acceleration signal Acc[x,y,z] indicative of accelerations acting on the pointing electronic device 1 along three axes X, Y, Z of a 3D-space inertial reference system associated with the same pointing electronic device 1 (in the example, the axes X, Y, Z of the 3D-space inertial reference system follow the so-called "ENU", East North Up, orientation, according to which axis X points East, axis Y points North, and axis Z points upwards);

a gyroscope sensor 4, in particular a MEMS triaxial gyroscope, providing a gyroscopic signal Gyro[x,y,z] indicative of the angular rate around the three axes X, Y, Z of the 3D-space inertial reference system associated with the electronic device 1; and a sensor-fusion processing stage 5, coupled to the accelerometer sensor 2 and to the gyroscope sensor 4, to receive at its input the acceleration signal Acc and the gyroscopic signal Gyro, and configured to jointly process the accelerometric and gyroscopic signals with a 6-DoF (six Degrees of Freedom) sensor fusion algorithm (the inputs of the algorithm being the same acceleration and gyroscopic signals Acc, Gyro).

The pointing electronic device 1 further comprises a pointing determination stage 8, coupled to the sensor-fusion processing stage 5 and to the gyroscope sensor 4, configured to perform a pointing algorithm for translating the movements of the electronic device 1 in the 3D-space into displacements in a bi-dimensional screen frame (i.e., within a displayed area of a host apparatus coupled to the electronic device 1).

In particular, the sensor-fusion processing stage 5 is configured to generate at the output a roll estimation quantity, denoted as β', indicative of the orientation of the pointing electronic device 1, in particular of the roll or tilt angle about its longitudinal axis; and the pointing determination stage 8 is configured to compensate the gyroscopic signal Gyro based on the roll estimation quantity β' and to remap the compensated gyroscope measurements in displacements in the screen frame.

It is noted that the above roll estimation quantity β' may be an actual estimated roll angle or a different quantity that is indicative of the roll angle and/or from which the same roll angle may be determined.

FIG. 2 schematically shows the electronic device 1, the three axes X, Y and Z of the associated reference system and the gyroscopic signal Gyro[x, y, z] along the same three axes X, Y and Z. In particular, axis Y represents the axis of longitudinal extension of the electronic device 1; axis X represents a transversal axis, with respect to the same longitudinal extension; and axis Z represents a vertical axis, orthogonal to the horizontal plane defined by the X and Y axes.

Angle β about axis Y represents here the true roll or tilt angle of the pointing electronic device 1, that should be ideally used to rotate (compensate) gyroscope signals in order to provide a roll-independent pointer output, since the user cannot be forced to maintain a fixed device orientation during its use. It is indeed noted that rotation of the electronic device 1 around the Y axis (in the case of using an ENU reference system) does not participate in the pointing operation and thus in the determination of corresponding displacements in the screen-frame.

In general, in the above sensor-fusion processing stage 5, the gyroscopic signal Gyro and the acceleration signal Acc are jointly processed with a respective weight coefficient, determining the weight (or relative importance), in the determination of the output roll estimation quantity r. In particular, the acceleration signal Acc is used to compensate and recover integration errors of the gyroscopic signal Gyro, which accumulate over time, and it is weighed more during still or slowly-moving conditions of the pointing electronic device 1 (when linear accelerations, i.e., accelerations in addition to the gravity acceleration, are negligible with respect to the same gravity acceleration).

In a possible embodiment, the sensor fusion stage 5 may implement a complementary filter, to combine the acceleration signal Acc and the gyroscopic signal Gyro and to generate at the output the roll estimation quantity β' (it is underlined, in any case, that the present disclosure is not limited to any particular implementation of the sensor-fusion stage 5, which may be of any known type allowing to generate the output estimate for the orientation compensation based on accelerometer and gyroscope input signals).

In the complementary filter embodiment, the roll estimation quantity β' may for example be expressed as:

$$\beta'(t)=(1-K_{acc})*(\beta'(t-1)+Gyro_y*dt)+K_{acc}*\beta_{acc}(t)$$

where the first component ($\beta'(t-1)+Gyro_y*dt$) is obtained from gyroscope integration and is weighted by a first weight coefficient ($1-K_{ace}$) and the second component $\beta_{ace}(t)$ is obtained from the accelerometer sensor 2 and is weighted by a second weight coefficient $K_{ace}$ (wherein the sum of the first and second coefficients is equal to one). In a possible implementation, weight coefficient $K_{ace}$ may be comprised between 0.01 and 0.02, during normal operation of the pointing electronic device 1.

As it is known, new generation devices (in particular, the above cited smart pens or similar devices) require a very low-power consumption in order to improve battery life, due to the fact that size, and consequently battery size, is limited and device battery duration is a key design parameter.

Moreover, an accurate user experience has to be guaranteed, e.g., in terms of accuracy, precision, latency and smoothness of the overall use and operation of the devices, in all possible use scenarios.

In order to reduce power consumption, a known solution envisages having the gyroscope sensor 4 in a power-on mode only during operation of the pointing electronic device 1 as a pointer (i.e., to display the cursor or the like displayed object on the screen-frame of the host apparatus). In particular, a button or similar interface element, on the pointing electronic device 1 is operated, e.g., pressed, by the user when operation as a pointer is required; the same button is e.g., released when pointing operation is to be disabled.

When pointing operation is disabled, the gyroscope sensor 4 is thus in a power-off mode, so that power consumption can be greatly reduced (it is noted that the gyroscope is an active sensor, with a moving mass that is actuated at the resonance frequency). Instead, the accelerometer sensor 2 can be always kept in the power-on mode (being a passive sensor, its power consumption is in any case limited).

The present Applicant has realized that this solution, although advantageous in terms of power consumption, may lead to a decrease in the user experience, at least in certain operating conditions (e.g., gaming applications).

In particular, the present Applicant has realized that an operating scenario may occur, in which the pointing electronic device 1 is enabled for pointing operations (e.g., via the user pressing the corresponding button), while the same device is shaking (i.e., it is subject to back and forth linear accelerations along a certain direction, e.g., along the x axis of the 3D-space inertial reference system associated with the same pointing electronic device 1).

In this operating scenario, at start-up of the pointing operations, orientation compensation based on the roll estimation quantity β' may not be performed correctly, leading to the displayed cursor moving with an unexpected inclination angle compared to the user motion.

In particular, upon start-up, roll estimation is initially based only on the acceleration signal Acc (since the gyroscope sensor is in the off state), and this signal is affected by high linear acceleration, due to shaking of the pointing electronic device 1.

Figure 3A:
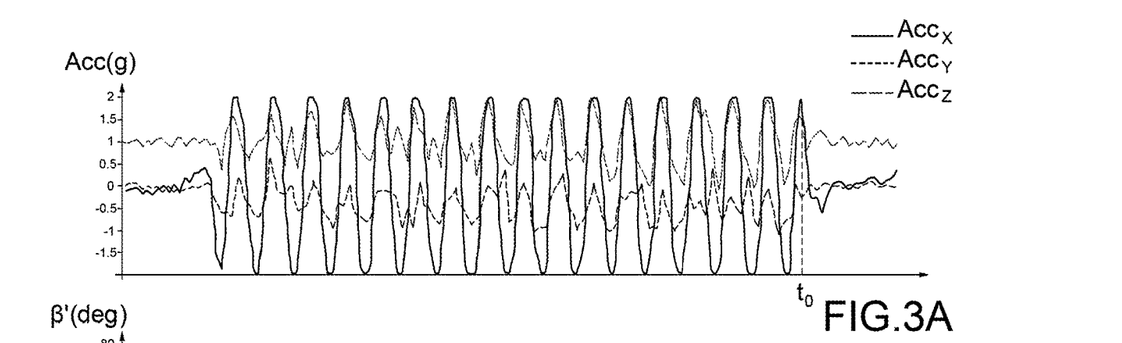
FIGS. 3A and 3B show plots of acceleration signal components and, respectively, of a roll estimation quantity during a shaking motion of the pointing electronic device, before start-up of pointing operations.

In this respect, FIG. 3A shows the plots of the components of the acceleration signal Acc along the three axes X, Y, Z, in a time interval, following an initial steady (or quiet) state, in which the pointing electronic device 1 is shaking; at time $t_0$, when the device is still shaking, the user initiates the pointing operations by pressing the corresponding button (time $t_0$ therefore corresponds to the start-up time of the pointing operations).

Figure 3B:
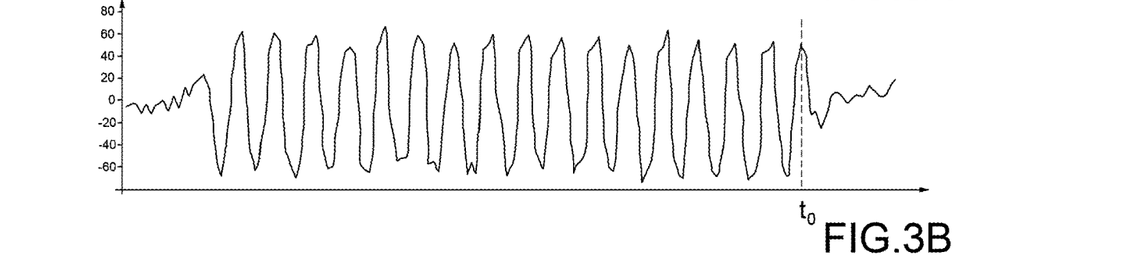

FIG. 3B shows the corresponding plot of the roll estimation quantity β' (in this case being an actual estimate of the roll angle β), during the same time interval, which is determined by the sensor fusion stage 5 based on the sole acceleration signal Acc (the gyroscope sensor 4 being off); the roll estimation quantity β' varies in a wide interval (in the example between +/−70 deg), so that the starting value of the same roll estimation quantity β' at time $t_0$ (in the example equal to about +40 deg), used to initialize the pointing algorithm implemented by the pointing determination stage 6, is also affected by the same variability. The starting estimate for roll compensation may therefore be even much different compared to the actual, real, orientation of the pointing electronic device 1.

Figure 4A:
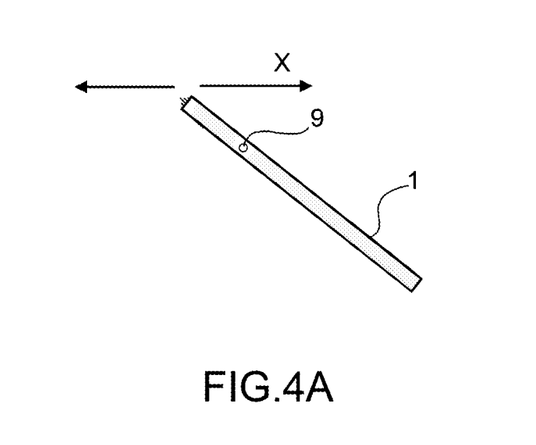
FIG. 4A is a schematic depiction of the pointing electronic device during the shaking motion and FIG. 4B is a schematic depiction of the corresponding movement of a cursor displayed on a screen-frame of a host apparatus coupled to the pointing electronic device.

FIG. 4A schematically shows the pointing electronic device 1 subjected to the shaking movement along the x-axis direction, when the user presses the button, here denoted with 9, for activating the pointing operations.

Figure 4B:
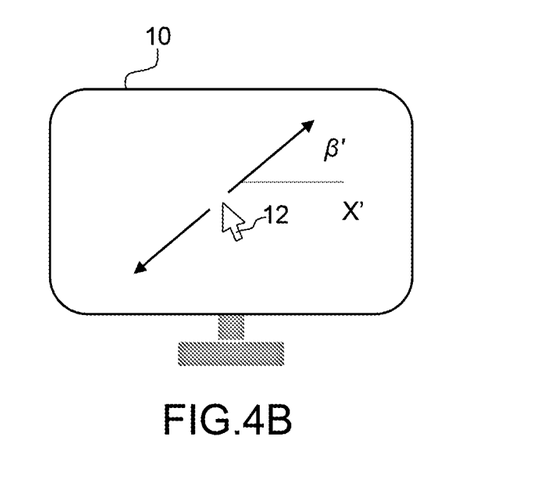

FIG. 4B schematically shows the screen frame, here denoted with 10, of a host apparatus, with the corresponding movement of a cursor 12 displayed thereon. In particular, instead of having the cursor 12 moving along a horizontal direction X' of the screen frame 10, the same cursor 12 moves along a direction that is inclined of a certain angle (substantially corresponding to the initial value of the roll estimation quantity β') with respect to the horizontal direction.

In known solutions, either the starting error in the estimation of the orientation of the pointing electronic device 1 is not recovered until the motion of the same device is stopped, or it may take a very long time (even in the order of about 20 seconds) for the recovery of the same starting error. In the first case, the acceleration signal Acc is not used in the determination of the roll estimation quantity β' as long as the pointing electronic device 1 is shaking; in the second case, the same acceleration signal Acc is used in the determination of the roll estimation quantity β' but with a weight coefficient that is purposely kept low, in order to ensure proper linear acceleration rejection.

Both known solutions may not be acceptable for applications, e.g., gaming applications, having high requirements in terms of the user experience.

The aim of the present solution is to solve the problems previously highlighted and to provide an improved pointing solution assuring a fast recovery of the roll estimation error at start-up of the pointing operations.

Figure 5:
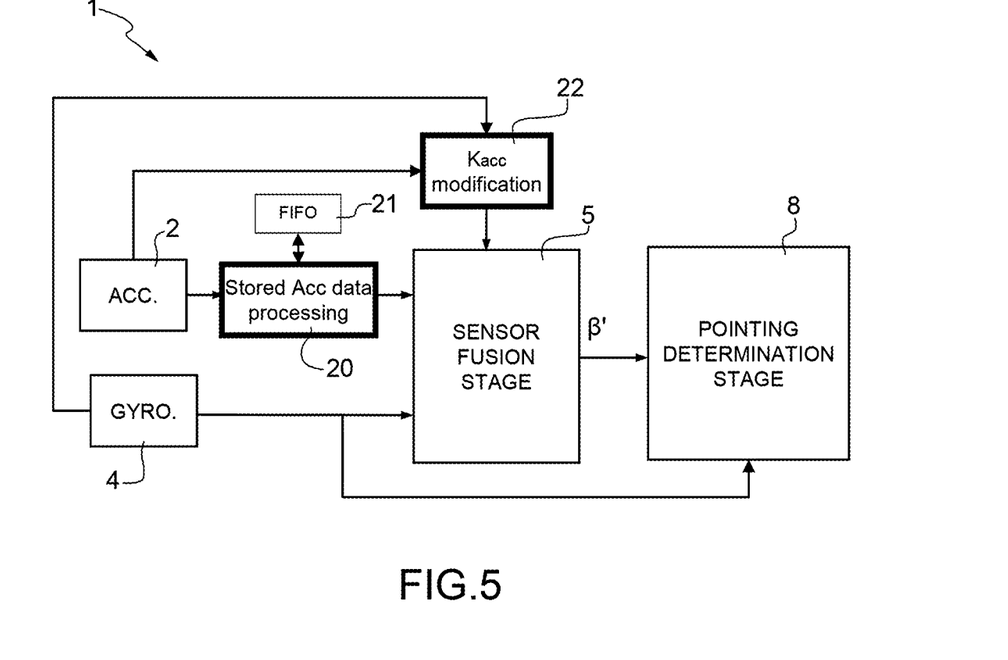
FIG. 5 is a schematic block diagram of a pointing electronic device, according to an embodiment of the present solution.

As schematically shown in FIG. 5, the present solution envisages two additional processing blocks, that are added to the architecture of the pointing electronic device 1 (as discussed with reference to FIG. 1, so that similar elements are denoted with the same numeral references and are not discussed again in the following).

In particular, a first processing block 20 is configured to improve the starting value of the roll estimation quantity $\beta'$, that is used as input to the pointing algorithm (as previously discussed), and thus to decrease the initial roll estimation error at start-up; and a second processing block 22 is configured to increase the speed of recovery of the same roll estimation error in the time interval immediately following start-up of the pointing operations.

The first processing block 20 is coupled to the accelerometer sensor 2 to receive the acceleration signal Acc and is moreover coupled to the sensor fusion processing stage 5.

The first processing block 20 is configured to store past values of the acceleration signal Acc (in particular a certain number of last samples of the same acceleration signal Acc), at least during the time interval in which the pointing operation by the pointing electronic device 1 is disabled (i.e., during which the acceleration sensor 2 is on, while the gyroscope sensor 4 is in a power-off mode).

Figure 6:
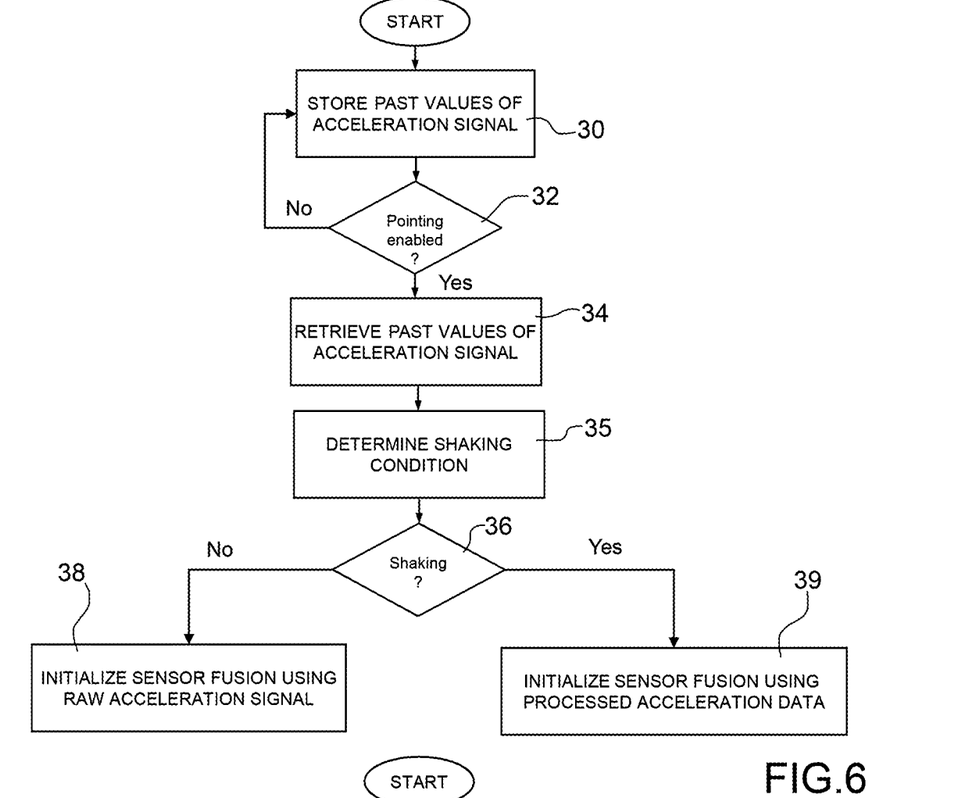
FIGS. 6 and 7 are flow-charts of operations performed by processing blocks of the pointing electronic device of FIG. 5.

In particular, reference is also made to FIG. 6, the first processing block 20 is configured to store, step 30, a certain number of past values (samples), and to update the stored values as new values of the acceleration signal Acc are acquired; for example, the stored values may relate to a past time interval having a duration comprised between 0.4 and 1 s.

In a possible embodiment, as shown in the above FIG. 5, the first processing block 20 comprises a hardware storage unit 21, for example a FIFO (First In First Out) buffer, to store the past values of the acceleration signal Acc.

The first processing block 20 is moreover configured (see again FIG. 6, step 32), when pointing operation by the electronic pointer device 1 is enabled (e.g., upon actuation of the corresponding interface element by the user, for example upon pressing of the corresponding button) to: retrieve the stored past values of the same acceleration signal Acc (step 34), which thus relate to a time interval immediately preceding the enabling (start-up) of the pointing operation; and to process the same stored past values in order to improve the initial roll estimate made by the sensor fusion processing stage 5 (which operates according to any known sensor fusion algorithm, e.g., based on a complementary filter, as previously discussed).

According to a possible embodiment, the first processing block 20 is configured to determine a shaking condition of the pointing electronic device 1 (step 35), based on the processing of the stored past values of the acceleration signal Acc. For example, the first processing block 20 may determine the shaking condition by computing the variance of the acceleration signal Acc (e.g., the variance of each of the acceleration components $Acc_x$, $Acc_y$, $Acc_z$ along the three axes x, y, z), and to determine the occurrence of the shaking condition if the computed variance is higher than a certain acceleration threshold.

If the pointing electronic device 1 is not shaking (steps 36, 38), i.e., the occurrence of the shaking condition has not been determined, the first processing block 20 causes the sensor fusion processing stage 5 to initialize the corresponding sensor fusion algorithm based on the raw (i.e., not processed) acceleration signal Acc, in particular based on the past values of the acceleration signal Acc as acquired by the acceleration sensor 2 (the operation of the sensor fusion processing stage 5 in this case is not modified).

Otherwise, if the pointing electronic device 1 is shaking, i.e., the occurrence of the shaking condition has been determined, the first processing block 20 (steps 36, 39) implements a preliminary processing of the stored past values of the acceleration signal Acc. The result of the processing (i.e., processed acceleration data) is used to initialize the sensor fusion processing stage 5, so as to improve the initial roll estimation quantity $\beta'$.

In particular, the above preliminary processing may include determining an average of the past values of the acceleration signal Acc, or implementing a filtering, e.g., a low-pass filtering, of the past values of the acceleration signal Acc, in any case generating processed acceleration data that are used by the sensor fusion processing stage 5 to initialize the sensor fusion algorithm.

Referring again to FIG. 3A, preliminary processing of the values of the acceleration signal Acc before time $t_0$ (corresponding to enabling or start-up of the pointing operation), may allow to reduce the initial error in the roll estimate: for example, the starting value of the roll estimation quantity $\beta'$ at time $t_0$ may be +10 deg, instead of +40 deg (as in the example discussed before).

As shown in the above FIG. 5, the second processing block 22 is coupled to the accelerometer sensor 2 to receive the acceleration signal Acc and to the gyroscope sensor 4 to receive the gyroscopic signal Gyro and is moreover coupled to the sensor fusion processing stage 5.

The second processing block 22 is configured to cause a dynamic roll estimation error recovery and in particular is configured to dynamically modify the value of the weight coefficient (generally denoted as $K_{acc}$) assigned to the acceleration signal Acc in the sensor fusion processing stage 5 and thus the importance assigned to the same acceleration signal Acc in the determination of the roll estimation quantity $\beta'$.

Figure 7:
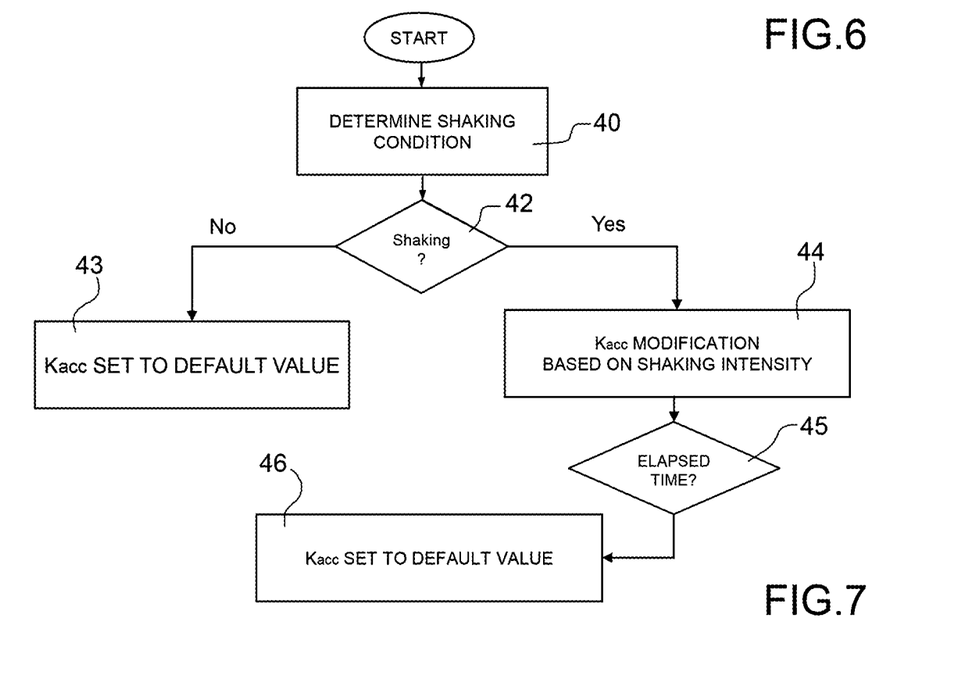

In particular, as also shown in FIG. 7, the second processing block 22, after start-up of the pointing operations (e.g., after actuation of the corresponding interface element by the user, for example upon pressing of the corresponding button), is configured to estimate a shaking intensity $I_{shake}$ associated to a shaking condition of the pointing electronic device 1 (step 40), based on the processing of both the acceleration signal Acc and gyroscopic signal Gyro (it is noted that the gyroscope sensor 4 is now in power-on mode).

For example, the second processing block 22 may determine the shaking intensity $I_{shake}$ based on the variance of the acceleration signal Acc and of the gyroscopic signal Gyro (e.g., the variance of each of the acceleration-signal components $Acc_x$, $Acc_y$, $Acc_z$ and gyroscopic-signal components $Gyro_x$, $Gyro_y$, $Gyro_z$ along the three axes x, y, z).

If the pointing electronic device 1 is not shaking (steps 42, 43), i.e., the estimated shaking intensity $I_{shake}$ is below a given threshold (in the example, the variance of the acceleration-signal components $Acc_x$, $Acc_y$, $Acc_z$ and gyroscopic-signal components $Gyro_x$, $Gyro_y$, $Gyro_z$ along the three axes x, y, z are below a respective threshold), the value of the weight coefficient $K_{acc}$ is not modified, being set to a default value used in standard operating conditions (for example, as previously discussed, the default value of the weight coefficient $K_{acc}$ may be comprised between 0.01 and 0.02, in case of a complementary-filter implementation of the sensor fusion processing stage 5).

On the contrary, if the pointing electronic device 1 is shaking (steps 42, 44), i.e., the estimated shaking intensity $I_{shake}$ is higher than, or equal to, the given threshold (in the example, the variance of the acceleration-signal components $Acc_x$, $Acc_y$, $Acc_z$ and gyroscopic-signal components $Gyro_x$, $Gyro_y$, $Gyro_z$ along the three axes x, y, z are higher than or equal to the respective threshold), the value of the weight coefficient $K_{acc}$ is dynamically modified as a function of the same estimated shaking intensity $I_{shake}$:

$$K_{acc}=f(I_{shake}).$$

In a possible embodiment, the weight coefficient $K_{acc}$ is increased based on the estimated shaking intensity $I_{shake}$ (with respect to a default value), in order to allow for a faster recovery of the roll estimation error (for example, the value of the weight coefficient $K_{acc}$ is increased up to a value comprised between 0.07 and 0.08, in case of the complementary-filter implementation of the sensor fusion processing stage 5).

After a given time interval following start-up of the pointing operation (step 45), for example equal to several seconds (e.g., equal to 5 s), the above recovery of the roll estimation error is disabled and the weight coefficient $K_{acc}$ is set back (step 46) to the default value used in standard operating conditions (for example, as previously discussed, the value of the weight coefficient $K_{acc}$ is again decreased to the value comprised between 0.01 and 0.02, in case of the complementary-filter implementation of the sensor fusion processing stage 5); normal operation of the sensor fusion processing stage 5 then follows.

The Applicant has realized that the above-discussed dynamic increase of the weight coefficient $K_{acc}$ assigned to the acceleration signal Acc in the sensor fusion algorithm implemented by the sensor fusion processing stage 5 advantageously allows to achieve a faster recovery of the roll estimation error (since the acceleration signal Acc weighs more in the determination of the output roll estimation quantity r). For example, with the same operating conditions, a recovery time of just 3 seconds may be achieved, instead of the 20 seconds needed for known solutions.

However, the Applicant has also realized that a possible drawback of the increase of the weight coefficient $K_{acc}$ lies in a certain instability of the value of the output roll estimation quantity β', due to the fact that the linear accelerations originated by the shaking motion are not properly filtered by the sensor fusion processing stage 5 (again since the acceleration signal Acc weighs more in the determination of the output roll estimation quantity β'). The consequence of this instability may be a corresponding drift of the cursor 12 or the like displayed object on the screen-frame 10 of the host apparatus.

Figure 8:
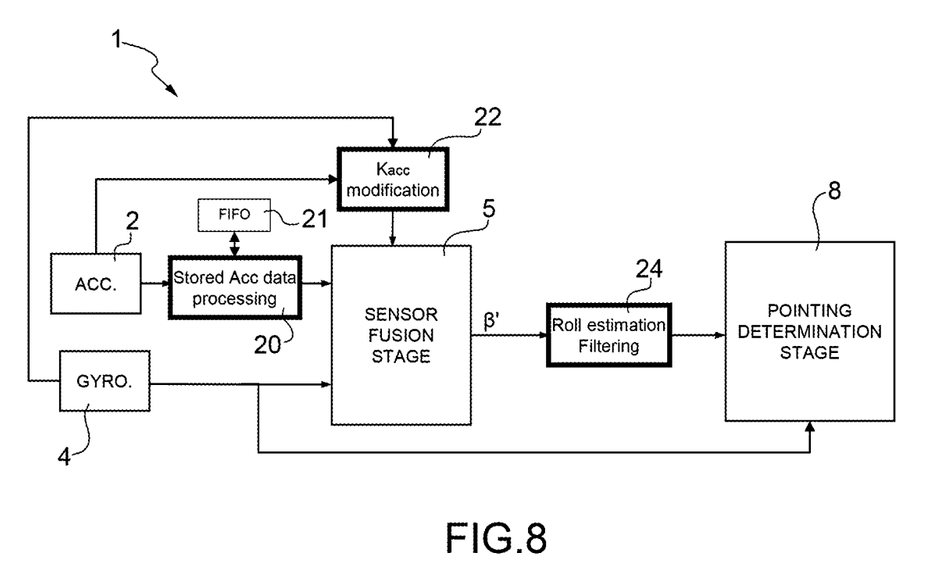
FIG. 8 is a schematic block diagram of a pointing electronic device, according to a further embodiment of the present solution.

According to a possible embodiment, as shown in FIG. 8, a filtering block 24 is therefore introduced, at the output of the sensor fusion processing stage 5, configured to filter the output roll estimation quantity r before the same roll estimation quantity β' is used in the pointing determination stage 8.

In particular, the filtering block 24 is configured to implement a low-pass filtering of the roll estimation quantity β', which allows to avoid the instability of the value of the same output roll estimation quantity β' and the corresponding drift of the cursor or the like displayed object on the screen-frame of the host apparatus.

The filtering block 24 is advantageously enabled during the time interval in which the value of the weight coefficient $K_{acc}$ is modified (see above steps 44) and again disabled at the end of the given time interval after start-up of the pointing operation (see above step 45), after which the recovery of the roll estimation error is disabled and the weight coefficient $K_{acc}$ is set back to the default value used in standard operating conditions.

Figure 9:
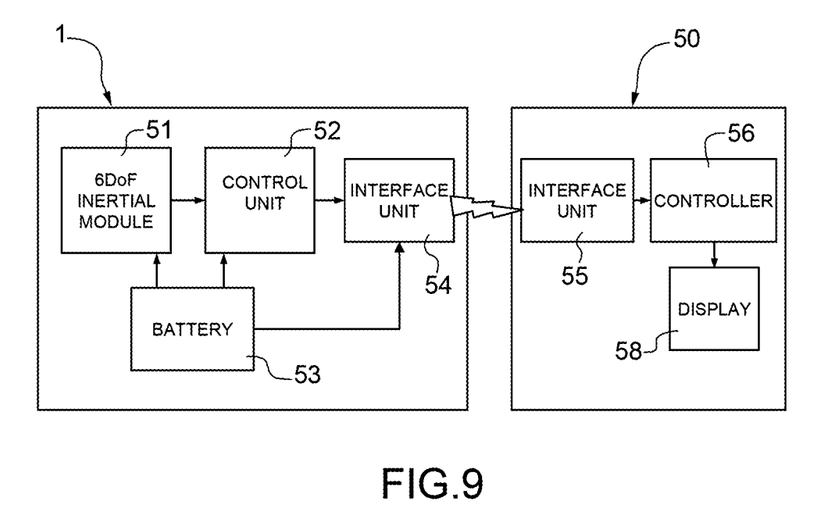
FIG. 9 is a schematic block diagram of a system comprising the pointing electronic device and host apparatus.

FIG. 9 schematically shows the pointing electronic device 1, of the hand-held or portable type, for example a smart pen or stylus, communicatively coupled to a host apparatus 50, for example a smartphone, a phablet or a tablet.

The pointing electronic device 1 comprises, within a case or housing thereof, an inertial measurement module 51, in particular a hardware module including (in a manner not shown in detail) the accelerometer sensor 2, the gyroscope sensor 4 and, in a possible embodiment, the sensor-fusion stage 5 (both accelerometer and gyroscope sensors 2, 4 and the sensor-fusion stage 5, e.g., made as an ASIC—Application Specific Integrated Circuit, may be integrated in a same packaged chip).

According to a possible embodiment, the pointing determination stage 8 may be implemented in a main control unit 52 of the pointing electronic device 1, having a microcontroller (or similar processing or computing unit) and a suitable non-volatile memory storing computing instructions to execute the pointing algorithm and generate at the output displacement information to be received by the coupled host apparatus 50 to implement a user interface (for example for moving the cursor 12 or similar displayed element on the screen frame 10 of the same coupled host apparatus 50). The main control unit 52 implementing the pointing determination stage 8 may be a dedicated control unit, or may also have other functions, e.g., for controlling the general operation of the pointing electronic device 1.

In this embodiment, the pointing determination stage 8 constitutes a software add-on, in addition to the hardware module 6, envisaging minimal use of resources.

The pointing electronic device 1 may further comprise: a battery 53, providing a power supply to the hardware module 6 (including the accelerometer sensor 2, the gyroscope sensor 4 and the sensor-fusion stage 5) and to the control unit 52 (implementing the pointing determination stage 8); and a communication interface unit 54, designed for wireless communication towards the host apparatus 50. The communication interface unit 54 may be implemented by a BLE (Bluetooth Low Energy) control unit implementing a Bluetooth low-power wireless communication between the pointing electronic device 1 and the coupled host apparatus 50.

The same host apparatus 50 may comprise: a respective communication interface unit 55, to communicate with the communication interface unit 54 of the pointing electronic device 1; a main controller 56, e.g., a microprocessor unit; and a display 58, defining the screen frame 10, on which movement of the cursor 12 or other similar displayed element is controlled by the main controller 56 according to the displacement information provided by the pointing electronic device 1 (it is noted that, in addition to the displacement information, any kind of further information may be communicated between the electronic device 1 and the host apparatus 50).

In particular, the above discussed first and second additional processing blocks 20, 22 (and filtering block 24) may alternatively be implemented: in the inertial measurement module 51 (in that case, with hardware processing blocks); in the main control unit 52; or in the BLE (Bluetooth Low Energy) control unit of the communication interface unit 54.

The advantages of the solution proposed are clear from the foregoing description.

In any case, it is again underlined that the proposed solution allows achieving very low power consumption, while keeping high pointer performance.

In particular, in the case of shaking of the pointing electronic device 1 at start-up of the pointing operations, an improved precision and user experience are provided.

The introduced first and second additional processing blocks 20, 22 entail minimum computational costs, leading to an optimal start-up shaking user experience while keeping very low current consumption.

It is noted that, although use in combination of the two additional processing block 20, 22 is particular advantageous, each block provides specific advantages that improve the performance of the pointing electronic device 1.

In particular, the first additional processing block 20 assures a fast estimation at start-up in case the pointing electronic device 1 is not shaking and an improved preliminary estimation of the device orientation in case of shaking.

The second additional processing block 22 assures a very fast recovery of the roll estimation error, while at the same time preserving the accuracy of the user experience (in a possible embodiment also thanks to the use of the filtering at the output of the sensor fusion processing stage 5 by the filtering block 24).

Finally, it is clear that modifications and variations may be made to what has been described and illustrated herein, without thereby departing from the scope of the present invention, as defined in the annexed claims.

In particular, it is again underlined that the roll estimation quantity β' at the output of the sensor fusion processing stage 5 may be a roll angle estimate or a different quantity indicative of the same roll angle, e.g., a gravity vector estimation. As it is known, the gravity vector, denoted in general with g, is an array of three values $[g_x, g_y, g_z]$, which correspond to the respective projections of the gravity acceleration $\vec{g}$ on the three axes X, Y, Z of the reference system associated with the pointing electronic device 1. The gravity vector is normalized with respect to the value of the acceleration of gravity (about 9.8 m/s$^2$), thus having a unitary module.

It is also underlined that the sensor-fusion processing stage 5 may implement any suitable generic sensor-fusion filter algorithm, to combine the acceleration signal Acc and the gyroscopic signal Gyro and to generate at the output the roll estimation quantity β' (it is again underlined that the present disclosure is not to be limited to a particular implementation of the sensor-fusion processing stage 5).

Moreover, it is noted that the pointing determination stage 8 may also be implemented as a hardware module and be integrated in the same packaged chip with the MEMS inertial sensors (the accelerometer and gyroscope sensors 2, 4 and possibly further sensors, such as a magnetometer) and with the related processing circuit.

Moreover, it is again underlined that the electronic device 1 may be a dedicated pointer device or may also have additional functions, besides the implementation of the pointing algorithm (as is the case for a smart pen or similar hand-held electronic device).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A pointing electronic device, comprising:
   an accelerometer sensor, configured to generate an acceleration signal indicative of accelerations acting on the pointing electronic device;
   a gyroscope sensor, configured to generate a gyroscopic signal indicative of angular rates of rotation of the pointing electronic device;
   a sensor fusion processing stage, coupled to the accelerometer sensor and gyroscope sensor, configured to generate an orientation estimation quantity indicative of an orientation of the pointing electronic device about a longitudinal axis based on a sensor fusion algorithm comprising joint processing of the acceleration signal and gyroscopic signal;
   a pointing determination stage, configured to:
      implement an orientation-compensation of the gyroscopic signal as a function of the orientation estimation quantity to determine an orientation-compensated gyroscopic signal; and
      generate screen-frame displacement data corresponding to 3D-space movements of the pointing electronic device based on the orientation-compensated gyroscopic signal; and
   a first processing block, configured to:
      store past values of the acceleration signal, during a time interval, preceding start-up, in which the accelerometer sensor is in a power-on mode and the gyroscope sensor is in a power-off mode; and
      upon start-up after pointing operation by the pointing electronic device is enabled, retrieve and process the stored past values of the acceleration signal to generate processed acceleration data, for use by the sensor fusion processing stage to initialize the sensor fusion algorithm and generate a starting value of a roll estimation quantity.

2. The device according to claim 1, wherein the first processing block comprises a hardware storage unit configured to store the past values of the acceleration signal.

3. The device according to claim 1, wherein the first processing block is configured to generate the processed acceleration data by:
   determining an average of the stored past values of the acceleration signal; or
   implementing a low-pass filtering of the stored past values of the acceleration signal.

4. The device according to claim 1, wherein the first processing block is configured to:
   determine whether a shaking condition of the pointing electronic device is occurring, based on the processing of the stored past values of the acceleration signal; and
   cause the sensor fusion processing stage to initialize the sensor fusion algorithm based on:
      the acceleration signal, if the shaking condition is not occurring; or
      the processed acceleration data if the shaking condition is occurring.

5. The device according to claim 4, wherein the first processing block is configured to determine whether the shaking condition is occurring by:
   computing a variance of the acceleration signal; and determining that the shaking condition is occurring if the computed variance is higher than a certain threshold.

6. The device according to claim 1, further comprising a second processing block, configured to:
modify a value of a weight coefficient assigned to the acceleration signal in the sensor fusion processing stage and thus an importance assigned to the acceleration signal in the generation of the starting value of the roll estimation quantity.

7. The device according to claim 6, wherein the second processing block is configured to:
estimate a shaking intensity associated with a shaking condition of the pointing electronic device, based on the joint processing of both the acceleration signal and the gyroscopic signal; and
modify the value of the weight coefficient as a function of the estimated shaking intensity.

8. The device according to claim 7, wherein the weight coefficient is increased based on the estimated shaking intensity with respect to a default value for standard operating conditions.

9. The device according to claim 8, wherein the second processing block is configured to:
modify the value of the weight coefficient when the estimated shaking intensity is higher or equal than a threshold; and
set the weight coefficient to the default value, when the estimated shaking intensity is lower than the threshold.

10. The device according to claim 8, wherein the second processing block is configured to set back the weight coefficient to the default value after a given time interval after start-up.

11. The device according to claim 6, further comprising a filtering block, at an output of the sensor fusion processing stage, configured to filter the roll estimation quantity before the roll estimation quantity is used in the pointing determination stage, during a time interval after start-up in which the value of the weight coefficient is modified.

12. The device according to claim 11, wherein the filtering block is configured to implement a low-pass filtering of the roll estimation quantity.

13. The device according to claim 1, further comprising a communication interface unit configured to transmit the screen-frame displacement data to a host apparatus having a display, wherein the screen-frame displacement data are configured to control movement of a displayed element on a screen frame of the display.

14. An electronic system comprising:
a pointing electronic device, comprising:
an accelerometer sensor, configured to generate an acceleration signal indicative of accelerations acting on the pointing electronic device;
a gyroscope sensor, configured to generate a gyroscopic signal indicative of angular rates of rotation of the pointing electronic device;
a sensor fusion processing stage, coupled to the accelerometer sensor and gyroscope sensor, configured to generate an orientation estimation quantity indicative of an orientation of the pointing electronic device about a longitudinal axis based on a sensor fusion algorithm comprising joint processing of the acceleration signal and gyroscopic signal;
a pointing determination stage, configured to:
implement an orientation-compensation of the gyroscopic signal as a function of the orientation estimation quantity to determine an orientation-compensated gyroscopic signal; and
generate screen-frame displacement data corresponding to 3D-space movements of the pointing electronic device based on the orientation-compensated gyroscopic signal;
a first processing block, configured to:
store past values of the acceleration signal, during a time interval, preceding start-up, in which the accelerometer sensor is in a power-on mode and the gyroscope sensor is in a power-off mode; and
upon start-up, retrieve and process the stored past values of the acceleration signal to generate processed acceleration data, for use by the sensor fusion processing stage to initialize the sensor fusion algorithm and generate a starting value of a roll estimation quantity after pointing operation by the pointing electronic device is enabled; and
a first communication interface unit configured to transmit the screen-frame displacement data; and
a host apparatus, coupled to the pointing electronic device, and comprising:
a second communication interface, configured to:
communicate with the pointing electronic device; and
receive the screen-frame displacement data;
a display defining a screen frame; and
a main controller, configured to control movement of a displayed element on the screen frame of the display according to the screen-frame displacement data received by the second communication interface.

15. A method for generating screen-frame displacement data based on 3D-space movements of a pointing electronic device, the method comprising:
generating an orientation estimation quantity indicative of an orientation of the pointing electronic device about a longitudinal axis based on a sensor fusion algorithm comprising joint processing of an acceleration signal, indicative of accelerations acting on the pointing electronic device, and of a gyroscopic signal, indicative of angular rates of rotation of the pointing electronic device;
implementing an orientation-compensation of the gyroscopic signal as a function of the orientation estimation quantity to determine an orientation-compensated gyroscopic signal;
generating the screen-frame displacement data corresponding to the 3D-space movements of the pointing electronic device based on the orientation-compensated gyroscopic signal;
storing past values of the acceleration signal, during a time interval, preceding start-up, in which the acceleration signal is active and the gyroscopic signal is inactive; and
upon start-up after pointing operation by the pointing electronic device is enabled, retrieving and processing the stored past values of the acceleration signal to generate processed acceleration data, for initializing the sensor fusion algorithm and generating a starting value of a roll estimation quantity.

16. The method according to claim 15, further comprising increasing a speed of recovery of an initial orientation estimation error in a time interval immediately following start-up, by modifying a value of a weight coefficient assigned to the acceleration signal in the sensor fusion algorithm and thus an importance assigned to the acceleration signal in the generating the starting value of the roll estimation quantity.

17. The method according to claim 16, wherein modifying the value of the weight coefficient comprises increasing the weight coefficient based on an estimated shaking intensity with respect to a default value for standard operating conditions, in order to allow for a faster recovery of the initial orientation estimation error.

18. The method according to claim 17, wherein modifying the value of the weight coefficient comprises setting back the weight coefficient to the default value after a given time interval after start-up.

19. The method according to claim 15, wherein the processed acceleration data is generated by:
- determining an average of the stored past values of the acceleration signal; or
- implementing a low-pass filtering of the stored past values of the acceleration signal.

20. The method according to claim 15, further comprising:
- determining whether a shaking condition of the pointing electronic device is occurring, based on the processing of the stored past values of the acceleration signal; and
- initializing the sensor fusion algorithm based on:
  - the acceleration signal, if the shaking condition is not occurring; or
  - the processed acceleration data if the shaking condition is occurring.

* * * * *